United States Patent [19]

Clements

[11] Patent Number: 5,503,790
[45] Date of Patent: Apr. 2, 1996

[54] METHOD OF PRODUCING DISPOSABLE ARTICLES UTILIZING REGRIND POLYETHYLENE TEREPHTHALATE (PET)

[75] Inventor: Jack Clements, Ada, Okla.

[73] Assignee: Solo Cup Company, Highland Park, Ill.

[21] Appl. No.: 334,856

[22] Filed: Nov. 4, 1994

Related U.S. Application Data

[63] Continuation of Ser. No. 101,331, Aug. 2, 1993, abandoned, which is a continuation of Ser. No. 787,023, Nov. 4, 1991, abandoned, which is a continuation-in-part of Ser. No. 417,721, Oct. 5, 1989, abandoned.

[51] Int. Cl.$^6$ ..................................................... B29B 11/10
[52] U.S. Cl. ................................. 264/176.1; 264/210.1; 264/210.6; 521/48; 525/444
[58] Field of Search ............................. 264/176.1, 210.1, 264/210.6; 525/444; 521/48; 528/481, 501

[56] References Cited

U.S. PATENT DOCUMENTS

| | | |
|---|---|---|
| 3,956,229 | 5/1976 | Bollen et al. . |
| 3,975,355 | 8/1976 | Bollen et al. . |
| 3,975,485 | 8/1976 | Bollen et al. . |
| 4,044,188 | 8/1977 | Segal . |
| 4,107,251 | 8/1978 | Bollen et al. . |
| 4,123,473 | 11/1978 | Amin et al. . |
| 4,138,374 | 12/1978 | Currie ...................................... 521/48 |
| 4,230,656 | 10/1982 | Amin et al. . |
| 4,318,882 | 3/1982 | Agrawal et al. . |
| 4,386,187 | 5/1983 | Grancio et al. . |
| 4,386,188 | 5/1983 | Grancio et al. . |
| 4,388,356 | 6/1983 | Hrivnak et al. . |
| 4,392,804 | 7/1983 | Pushee . |
| 4,405,556 | 9/1983 | Valyi . |
| 4,485,204 | 11/1984 | Nabors . |
| 4,486,366 | 12/1984 | Reddy . |
| 4,496,408 | 1/1985 | Hahn . |
| 4,511,322 | 4/1985 | Jakobsen et al. . |
| 4,547,536 | 10/1985 | Nabors . |
| 4,722,820 | 2/1988 | Flecknoe-Brown . |
| 4,778,551 | 10/1988 | Coffman . |

OTHER PUBLICATIONS

Melinar–"Polyethylene Terephthalate Product Information Sheet Extrusion & Thermoforming" Pub. No. 909–14, (Oct. 1988) ICI Films, Wilmington, Delaware.

Primary Examiner—Patricia A. Short
Attorney, Agent, or Firm—McAndrews, Held & Malloy, Ltd.

[57] ABSTRACT

The present invention is directed to a crack-proof, and resilient article of the PET type that is produced from about 40% to about 90% regrind PET. The article is characterized in that it has an intrinsic viscosity between 0.54 and 0.68. The present invention is also directed to a method for recycling regrind PET for use in the production of a clear, crack-proof, and resilient article includes the steps of:

(1) regrinding scrap thermoplastic PET upon isolation from the thermoformed articles into regrind PET;

(2) blending the regrind PET with virgin PET to form a blend wherein the percentage of regrind PET in the blend ranges from about 40% to about 90% and the percentage of virgin PET in said blend ranges from about 60% to about 10%;

(3) passing the blend of regrind PET and virgin PET through an extruder wherein no more than 10% of said regrind PET in the blend has been recrystallized, the extruder having a throat wherein the temperature ranges from about 550° F. to about 650° F., a vacuum for removal of steam, and having a die that is set a temperature for extruding sheets of thermoplastic PET;

(4) extruding the thermoplastic sheet of PET; and (5) thermoforming the disposable article out of the extruded thermoplastic sheet; the disposable article having an intrinsic viscosity from 0.54 to 0.68.

31 Claims, 1 Drawing Sheet

METHOD OF PRODUCING DISPOSABLE ARTICLES UTILIZING REGRIND POLYETHYLENE TEREPHTHALATE (PET)

This application is a continuation of application U.S. Ser. No. 08/101,331, filed Aug. 2,1993, now abandoned, which is a continuation of application U.S. Ser. No. 07/787,023, filed Nov. 4, 1991, now abandoned, which is a continuation-in-part of U.S. Ser. No. 07/417,721, filed Oct. 05, 1989, now abandoned.

BACKGROUND OF THE INVENTION a. Field of the Invention

This invention relates to a method for utilizing regrind polyethylene terephthalate (PET) for the production of disposable plastic cups, lids, clam-shell type trays, and containers. More particularly, the present invention is directed to a method for producing disposable plastic cups, lids, clam-shell type trays, and containers of the polyethylene terephthalate (PET) type wherein from 40% to 90% of the PET is regrind that has been directly recycled into the manufacturing process. This method is useful because it provides a clear and resilient cup, lid, clam-shell type tray, or container which does not crack when subjected to stress.

b. Prior Art

Numerous methods of producing disposable beverage bottles and other containers from PET, or blends of PET with other materials, such as polycarbonates, are disclosed in the prior art. However, based upon the cost of the raw starting materials, disposable articles such as plastic drinking cups, lids, clam-shell type trays, and containers are primarily made of polystyrene or polystyrene blends. Polystyrene suffers from the disadvantage in that it is brittle and cracks when subjected to stress. This is a serious disadvantage in a liquid filled cup or container that may crack and leak if squeezed too hard or impacted. As one solution to the problem, U.S. Pat. Nos. 4,386,187 and 4,386,188 (Grancio et al.) teach the use of olefin-styrene copolymer blends to produce containers having greater impact resistance than containers made from styrene alone. These copolymer blends, while tougher than polystyrene, suffer from the aesthetic disadvantage of not being very clear.

Because of cost, an even tougher plastic material, PET, which also has superior clarity over polystyrene or polystyrene blends, has been confined to use in situations wherein there is no alternative, e.g., carbonated beverage bottles. For example, carbonated beverage bottles, in addition to the requirement that they be aesthetically appealing, are required when full to withstand a 3–5 foot drop without cracking or leaking.

The thermoforming process accentuates the cost disadvantage of using PET for disposable article construction. Regardless of the plastic used, conventional thermoforming processes for any disposable cups, lids, clam-shell type trays, and containers convert approximately 50% of the starting resin sheet into uncontrollable scrap. With a high cost plastic resin, such as PET, the high cost of the scrap and its inability to be effectively recycled prohibit PETs competition with less expensive plastic resins, particularly in the highly competitive disposable goods market. The superior clarity and resilience (i.e., the ability to deform and return to shape without cracking) of PET were insufficient to overcome PET's serious cost and processing disadvantages.

The conventional teaching in the industry concerning the use of scrap PET is that a PET thermoforming resin should be virgin PET which contains no more than 20% of ground up scrap PET ("regrind PET") blended in. However, if regrind PET has been crystallized and dried by heating at 300°–350° F. for 3–5 hours, it can be added to the dried virgin material at up to 60% of the feedstock. [ICI Films' Product Information Sheet No. 909-14, Oct. 1988]. In this latter case, the dried and recrystallized regrind material becomes the functional equivalent of dried virgin material in the thermoforming process. However, the pretreatment of scrap PET, which is generated as at least 50% of the output of a typical PET thermoforming process, by converting it into recrystallized PET, which is usable, is both an energy and time consumptive process.

Accordingly, it is an object of the present invention to provide a method for utilizing regrind PET in a thermoforming process that minimizes or eliminates the need for pretreatment of the scrap PET via recrystallization and drying.

U.S. Pat. No. 4,392,804 (J. C. Pushee et al.) discloses a method by which scrap PET is recycled during manufacture of plastic articles. Under Pushee's method, the intrinsic viscosity (IV) of the scrap PET resin must be increased by "solid state polymerization" (heating the scrap resin for 3 to 24 hours in an oven set from 172°–230° C.; i.e., about 341° F. to about 446° F., where °F.=9/5° C. plus 32°) before it can be blended with virgin material. Like the prior art recrystallization step, Pushee's method is limited in that it requires 3 to 24 hours to convert a batch of scrap into a usable resin.

It is an object of the present invention to develop a method for utilizing, without pretreatment, the high levels of scrap PET from the conventional thermoforming process to produce thermoplastic PET sheets that are suitable for disposable article construction.

It is a further object of the present invention to utilize regrind PET to produce a disposable PET cup, lid, clam-shell type tray, or container having superior clarity and durability, and which can cost effectively compete with those objects produced by conventional plastic resins (e.g. polystyrene, polystyrene/polypropylene blends, polycarbonate and the like).

It is yet another object of the present invention to thermoform PET cups, lids, clam-shell type trays and containers from a PET mixture that is 50–90% regrind PET which would permit the utilization of regrind PET from outside sources.

SUMMARY OF THE INVENTION

The present invention is directed to a method for recycling scrap amorphous PET for use in producing clear, crack-proof, and resilient articles of the PET type, preferably disposable articles. The present invention is also directed to a clear, crack-proof and resilient article that are produced by the claimed process. The PET product that is produced by the method of this invention is characterized in that it has an intrinsic viscosity ranging from 0.54 to about 0.68, preferably from 0.55 to about 0.64. Optionally, the product may be colored by the incorporation of dyes or pigments.

The present method for utilizing regrind-PET for use in the production of a clear, crack-proof, and resilient article includes the steps of:

(a) regrinding scrap amorphous PET upon isolation from thermoformed articles to form regrind amorphous PET;

(b) blending the regrind amorphous PET with dried virgin crystalline PET to form a blend in which the percentage of regrind amorphous PET ranges from about 40% to about 90% by weight, and the percentage of virgin PET in the blend ranges from about 60% to about 10% by weight; and (c) passing the blend of regrind PET and virgin PET through an extruder, the extruder having the following limitations: the throat temperature of the extruder ranges from about 450° to 650° F.; and the extruder has a die that is set at a temperature for extruding thermoformed sheets of thermoplastic PET. The resultant thermoplastic sheet of PET is suitable for thermoformation of an article characterized by having an intrinsic viscosity ranging from 0.54 to 0.68. Preferably, the extruder is functionally affixed to a vacuum for removal of steam (water vapor) generated therein.

In order to achieve a thermoplastic PET sheet that has from about 80% to about 90% scrap PET and that is suited for disposable article production, it is sometimes necessary to pass from about 0% to about 10% of the scrap PET material through a recrystallizer for about an hour at a temperature ranging from 220° F. to 300° F. so as to increase its ability to handle the higher temperatures, such as at the throat of the extruder without becoming a tacky blob. Further it provides added back pressure to the screw of the extruder, when needed.

DETAILED DESCRIPTION OF THE INVENTION

Figure 1:
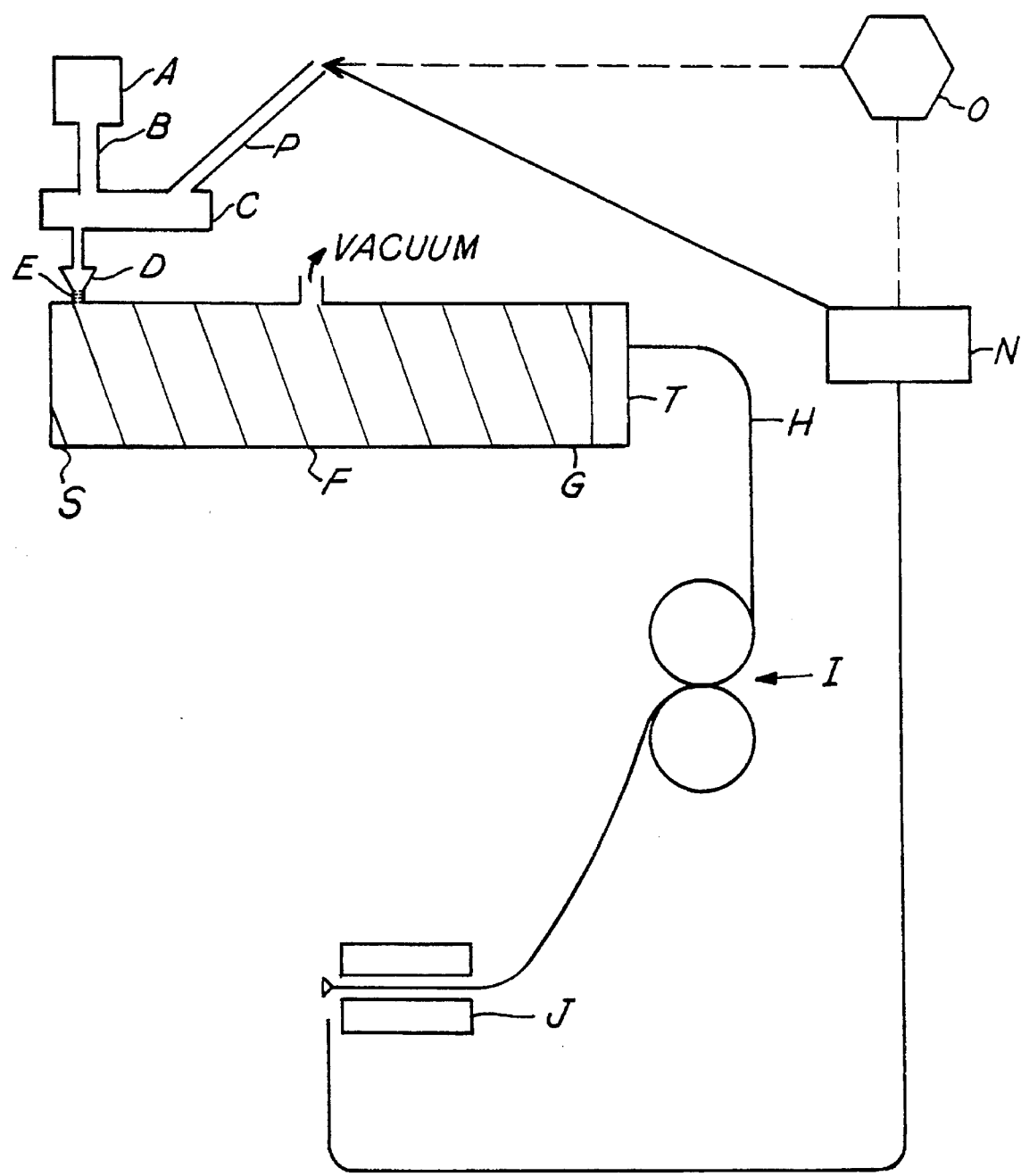
FIG. 1: Flow diagram of a process for manufacturing disposable PET articles from high percentages (40–90%) of regrind PET using the recycling method of the present invention.

The present invention relates to a method for recycling scrap amorphous PET to produce articles made of PET that are characterized in that the PET in the article has an intrinsic viscosity ranging from 0.54 to 0.68, preferably 0.55 to 0.64. The recycled amorphous PET of the present invention is particularly suited for use in disposable article construction whether by thermoforming or injection molding, preferably thermoforming. By the term "recycling," as used herein, is meant collecting amorphous PET obtained as scrap, e.g., from the thermoforming or injection molding process, for eventual grinding into "regrind PET." The term "recycling," as used herein, does not apply to the collection and segregation from garbage or trash of used PET bottles. Trash PET bottles are by both regulation and aesthetics unsuitable for use as containers for food items.

By "disposable articles" as used herein is meant items that are used for holding liquids, especially beverages, foods, or other materials and that are most often discarded after one use. Typical disposable articles include disposable drinking cups, souffle cups, deli-cups, cup lids ("lids"), clam-shell type trays such as those used for containing salads or sandwiches in delicatessens or super-markets, and other containers. The present method may not be suited for recycling regrind "bottle grade" PET back into beverage bottles, due to some loss of intrinsic viscosity in the regrind material. However, it is within the scope of the present invention to include recycling PET of sufficient intrinsic viscosity such that the resultant thermoplastic product would be suitable for use in beverage bottle formation. Crystalline virgin PET is available in a variety of grades from manufacturers such as Eastman Kodak and Goodyear. The intrinsic viscosity of commercially available virgin PET is 0.72 or greater.

PET is a hygroscopic material and as a result, its intrinsic viscosity decreases as a function of the amount of water absorbed. As schematically depicted in FIG. 1, in the initial step of the thermoforming process, crystalline virgin PET, preferably bottle grade or higher, is placed in an oven or hopper A and heated according to the manufacturer's specifications to drive off any moisture. The resultant PET is dehydrated crystalline virgin PET. Typical conditions require heating between 300° to 400° F. for four hours with an air flow of 1 cubic foot per minute ("CFM") per pound. For example, Eastman Kodak recommends heating its PET for 3 to 5 hours at 300° F. to drive off water prior to its use in thermoforming. Another manufacturer of crystalline PET, Goodyear, recommends heating its PET for 3 to 5 hours at 350° F.

In the process of the present invention, the dehydrated and crystalline virgin PET is then sent through a hose B and into a blender C wherein the dehydrated crystalline virgin PET is blended with regrind amorphous PET. Amorphous PET has two important temperatures: Tg, the glass transition temperature (i.e., the temperature at which the PET will flow) and Tm its melting temperature. These temperatures are about 170° F. and 450° F. respectively. In the process of the present invention and contrary to the recommendations of the PET manufacturer, the regrind amorphous PET is not subjected to a separate drying step before blending, nor is it co-dried with the virgin crystalline material. Rather, it is simply taken from the regrind housing and blended with the dehydrated crystalline virgin PET. The PET blend comprises from about 40% to about 90% regrind amorphous PET and from about 60% to about 10% dehydrated crystalline virgin PET; preferably, from about 40% to about 80% regrind amorphous PET; more preferably, from about 45% to about 75%; most preferably, from about 50% to about 70%.

The blended PET passes into and through a hopper D that is functionally positioned above a throat E. The hopper D should be of minimum size to reduce the residence time of the PET in the hopper D. The reduction in hopper residence time minimizes moisture pickup. Further, the temperature of the throat of the extruder should be from about 450° to about 650° F. The throat temperature varies as an inverse of the percentage of amorphous regrind in the PET blend. Thus, with increasing amounts of regrind in the blend, the throat temperature is lowered. For example, at 90% regrind, the throat temperature is lowered to about 450° F.

From the throat E, the heated virgin PET blend moves into an extruder F which is merely a heated barrel having a rotating screw-like shaft. The extruder F has a proximal end S and a distal end G, wherein the temperature within the extruder tapers downward from the proximal end to the distal end. Typical extruders are those available from Welex Instruments in Blue Bell, Pa. Preferably, the extruder F, has a hole or vent that is functionally affixed to a vacuum apparatus for drawing off any moisture as steam (water vapor) that is released by the PET within the extruder. More preferably, the hole or vent is positioned in approximately the center of the extruder as represented in FIG. 1. At the end of the screw of the extruder there is preferably a gear pump (not shown). The gear pump maintains a constant flow of material out the die and substantially eliminates the pulse beat at the end of the screw. The result is a sheet of PET of uniform thickness that is suitable for thermoforming. Gear pumps are commercially available from several manufacturers including Normag of Hickory, N.C. At the distal end G of the extruder F, there is a die T for extruding thermoplastic sheets. The die T is set at a temperature at or just below the melting point of any pre-selected PET virgin/scrap blend. The thermoplastic sheet H of PET containing a high percent of amorphous regrind (40%–90%) is extruded out of the die T. Upon extrusion in an in-line operation, the thermoplastic sheet H passes over rollers I, en route to a mold J. In the in-line operation, it is preferable that the rollers at I be chilled sufficiently with water, so that the thermoplastic sheet does not stick to the rollers. However, the sheet should not be excessively chilled so as to reduce the temperature of the thermoplastic PET sheet below its molding temperature.

The thermoplastic sheet is then thermoformed with a mold at J to form a plurality of drinking cups, souffle cups, deli-cups, lids, clam-shell type trays or other disposable containers. The disposable containers of the present invention are characterized by having an intrinsic viscosity between 0.54 and about 0.67–0.68, preferably between 0.55 and 0.64. Table 1 reports the actual intrinsic viscosities of a drinking cup, deli-cup, and souffle cup that were produced by the process of the present invention.

TABLE 1

| ITEM | INTRINSIC VISCOSITY | (duplicate) |
|---|---|---|
| drinking cup | .63 | .63 |
| deli-cup | .60 | .60 |
| souffle cup | .63 | No Result |

These intrinsic viscosities, which are consistent with 4–5 previous testings, ranged from 0.60 to 0.63.

To produce a disposable PET drinking cup, the thermoformer is preferably of the vacuum type having a plug assist. Thermoformers are commercially available from Irwin in Yakima, Wash., and Brown Machine Company in Beaverton, Mich.

As schematically shown in FIG. 1, upon thermoforming a disposable cup, lid, or container in a PET sheet, the scrap (i.e., the unformed portion of the PET sheet) is trimmed away from the cup, lid, or container and passes to the regrind housing N prior to passing into hose P. In order to achieve high levels (80–90%) of regrind PET in a thermoplastic sheet, it is occasionally necessary to channel a portion of the amorphous regrind PET from the regrind housing N to the crystallizer O for about an hour at a temperature ranging from 220° F. to 300° F. to recrystallize the amorphous regrind PET. This step takes the PET past its glass transition temperature (Tg=about 170° F.) and allows it to be handled at higher temperatures, such as found at the throat of the extruder, without becoming a sticky blob. Further, it provides the screw of the extruder with the necessary back pressure to extrude a quality thermoplastic sheeting that is suitable for thermoforming. By substituting, when needed, up to 10% recrystallized regrind PET for virgin PET in the PET blend, the total percentage of regrind PET which can be successfully incorporated into a thermoplastic sheet using the method of the present invention can consistently be increased from 80% up to 90% even with decreasing intrinsic viscosities in the amorphous regrind as it continues to be recycled. Thus, the above described addition of from 0–10% of recrystallized regrind is a processing aid that is used only when needed, i.e., when the molten PET blend is too watery to be extruded in a satisfactory manner.

It should be noted that in the extruder F the PET blend is converted into a semi-liquid mass having the consistency of stiff dough. As the dough-like mass of the PET blend passes through the extruder, it is subjected to a decreasing temperature gradient until it reaches the die T. In particular, the temperature of the PET blend decreases as a function of increasing distance from the throat E, wherein the throat temperature (450°–650° F.) always remains constant. This distally decreasing temperature gradient depends upon the percentage of regrind PET in the blend. As a result, the temperature at each point along the barrel of the extruder F will be lower for a PET blend containing a high percentage of regrind PET than it would be for a PET blend containing a low percentage of regrind PET. For example, when the extruder contains a 50\50 blend of virgin PET and regrind PET, the temperature at the distal end of the barrel is in the range of about 460° to about 470° F. Higher percentages of regrind (>50%) in the blend would expectedly result in a barrel temperature lower than 460°–470° F., whereas lower percentages (<50%) of regrind in the blend would expectedly result in a barrel temperature higher than 460°–470° F.

The vacuum apparatus that is used within the present invention should be able to draw a vacuum of at least 500 mm Hg or on another scale, raise a column of mercury greater than 20" typically no more than 30". As a practical matter, lower vacuum pressures, such as 30" of raised mercury, are more effective in removing water vapor from the molten PET blend.

It is also within the scope of the present invention to add antioxidants and/or thermally stable pigments and/or dyes to the PET blend. Alternatively, the virgin PET may be purchased already containing these additives. The use and/or purchase of such additives is well known to those skilled in the art.

Instead of thermoforming, an article of PET having an intrinsic viscosity from 0.54 to 0.68 can be made by injection molding. In injection molding, the extruder would not be pumping the heated PET blend out of a die as a sheet, rather, an extruder or pump would be injecting a molten blend of from 40% to 90% by weight amorphous regrind and from 60% to 10% by weight dried crystalline virgin PET into a mold. Techniques for injection molding are well known to those of ordinary skill in that art. See for example U.S. Pat. No. 4,381,275 which is incorporated herein by reference. The injection molded PET product could be any type of PET product. Preferably, the resultant product is a disposable article or a toy. Regardless of the product or how it was formed, it would be characterized in that it would have an intrinsic viscosity from 0.54 to 0.68, preferably 0.55 to 0.64.

What is claimed is:

1. A method for recycling PET for use in the thermoforming of a substantially crack-proof, and resilient article of the PET type comprising the steps of:

(a) regrinding scrap amorphous thermoplastic PET in solid form to form solid regrind amorphous PET;

(b) without dehydrating said solid regrind amorphous PET, blending said solid regrind amorphous PET with solid virgin PET to form a blend of solids wherein the percentage of regrind amorphous PET in said blend of solids ranges from about 40% to about 90% and the percentage of virgin PET in said blend of solids ranges from about 60% to about 10%;

(c) passing said blend of solids into and through an extruder, said extruder having a throat wherein said throat temperature ranges from about 450° to about 650° F. for melting said blend of solids, and a die that is set at a temperature for extruding sheets of thermoplastic PET; and (d) subjecting said blend of solids while inside of said extruder to a vacuum effective for substantial removal of steam generated therein during melting of the blend of solids, said extruded sheet of thermoplastic PET being suitable for thermoformation of said article.

2. The method of claim 1 wherein the resilient article is selected from the group comprised of a disposable drinking cup, a disposable souffle cup, a disposable deli-cup, a disposable lid, and a disposable clam-shell type tray.

3. The method of claim 1 wherein the article has an intrinsic viscosity greater than about 0.54.

4. The method of claim 1 wherein the virgin PET is dehydrated.

5. The method of claim 4 wherein the article has an intrinsic viscosity greater than about 0.54.

6. The method according to claim 5 wherein said article is a cup, lid, clam-shell type tray, or container.

7. The method according to claim 6 wherein said article is a disposable souffle cup, drinking cup, deli-cup, lid or clam-shell type tray.

8. The method according to claim 5 wherein said die has a temperature that ranges from about 450° to about 470° and said PET blend comprises about 50% regrind amorphous PET and about 50% virgin PET.

9. The method according to claim 5 wherein said extruder is vented to a vacuum pump that is capable of pulling a vacuum that is equal to or less than about 500 mm. mercury pressure.

10. The method according to claim 5 wherein said extruder is vented to a vacuum pump that is capable of producing a vacuum of between 20 inches and 30 inches mercury.

11. The method according to claim 5 wherein said percentage of regrind amorphous PET in said blend ranges from about 40% to about 80%.

12. The method according to claim 5 wherein said percentage of regrind amorphous PET in said blend ranges from about 45% to about 75%.

13. The method according to claim 5 wherein said percentage of regrind amorphous PET in said blend ranges from about 50% to about 70%.

14. The method of claim 5 wherein the thermoformed article is clear.

15. The method of claim 5 wherein the PET blend further contains a thermally stable pigment and/or dye.

16. The method according to claim 1 wherein said vacuum is equal to or less than about 500 mm. Hg pressure.

17. The method according to claim 1 wherein said percentage of regrind amorphous PET in said blend ranges from about 40% to about 80%.

18. The method according to claim 1 wherein said percentage of regrind amorphous PET in said blend ranges from about 45% to about 75%.

19. The method according to claim 1 wherein said percentage of regrind amorphous PET in said blend ranges from about 50% to about 70%.

20. The method according to claim 1 wherein the extruded sheet of thermoplastic PET is clear.

21. The method according to claim 1 wherein the blend further contains a thermally stable dye and/or pigment.

22. The method according to claim 1 wherein said scrap amorphous PET is trimmed from a PET sheet containing a disposable article.

23. A method for recycling PET for use in the thermoforming of a substantially crack-proof, and resilient article of the PET type comprising the steps of:

(a) regrinding scrap amorphous thermoplastic PET in solid form to form solid regrind amorphous PET;

(b) without dehydrating said solid regrind amorphous PET, blending said solid regrind amorphous PET with solid virgin PET to form a blend of solids wherein the percentage of regrind amorphous PET in the final blend of solids ranges from about 40% to about 90% and the percentage of virgin PET in the final blend of solids ranges from about 60% to about 10%;

(c) passing said blend of solids into and through an extruder, said extruder having a throat wherein said throat temperature ranges from about 450° to about 650° F. for melting said blend of solids, and a die that is set at a temperature for extruding sheets of thermoplastic PET; and (d) subjecting said blend of solids while inside of said extruder to a vacuum effective for substantial removal of steam generated therein during melting of the blend of solids, said extruded sheet of thermoplastic PET being suitable for thermoformation of said article.

24. The method according to claim 23 wherein said article is a cup, lid, clam-shell type tray, or container.

25. The method according to claim 23 wherein said article is a disposable souffle cup, drinking cup, deli-cup, lid or clam-shell type tray.

26. The method according to claim 23 wherein said extruder is vented to a vacuum pump that is capable of pulling a vacuum that is equal to or less than about 500 mm. mercury pressure.

27. The method according to claim 23 wherein said extruder is vented to a vacuum pump that is capable of producing a vacuum of between 20 inches and 30 inches mercury.

28. The method according to claim 23 wherein the extruded sheet of thermoplastic PET is clear.

29. The method according to claim 23 wherein the blend further contains a thermally stable dye and/or pigment.

30. The method according to claim 23 wherein said scrap amorphous PET is trimmed from a PET sheet containing a disposable article.

31. The method according to claim 23 wherein the virgin PET is dehydrated.

* * * * *